United States Patent
Beri et al.

(10) Patent No.: US 10,380,769 B1
(45) Date of Patent: Aug. 13, 2019

(54) ARRANGEMENT OF DRAWING OBJECTS ALONG ARBITRARY PATHS

(71) Applicant: Adobe Inc., San Jose, CA (US)

(72) Inventors: Tarun Beri, Noida (IN); Tarun Gehlaut, Faridabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/921,344

(22) Filed: Mar. 14, 2018

(51) Int. Cl.
*G06T 11/20* (2006.01)
*G06T 3/60* (2006.01)

(52) U.S. Cl.
CPC ............. *G06T 11/203* (2013.01); *G06T 3/60* (2013.01)

(58) Field of Classification Search
CPC ......... G06T 11/203; G06T 3/60; G06T 7/564; G06T 1/00; G06T 11/20; G06T 11/60; G09G 2360/06; G09G 5/363; G09G 2370/027; G09G 3/00; G06F 17/00–17/5095
See application file for complete search history.

(56) References Cited

U.S. PATENT DOCUMENTS

| | | | |
|---|---|---|---|
| 8,584,012 B1 * | 11/2013 | Orshanskiy | G06T 11/203 715/256 |
| 8,643,650 B1 * | 2/2014 | Vinchon | G06T 11/203 345/423 |
| 9,875,021 B2 * | 1/2018 | Petkov | G06Q 10/101 |
| 2004/0119724 A1 * | 6/2004 | Hawksworth | G06T 11/60 345/626 |
| 2011/0025693 A1 * | 2/2011 | Merry | G06T 11/203 345/442 |

OTHER PUBLICATIONS

Sederberg, T. W., "Algebraic Geometry for CAGD", BYU, Computer Aided Geometric Design Course Notes, Ch. 17, Aug. 18, 2016, pp. 187-210.

* cited by examiner

*Primary Examiner* — Maurice L. McDowell, Jr.
*Assistant Examiner* — Donna J. Ricks
(74) *Attorney, Agent, or Firm* — Brake Hughes Bellermann LLP

(57) ABSTRACT

Techniques of displaying drawing objects in a drawing application include generating a mapping table between points on a first path and a group of line segments along which drawing objects may be placed. Given the first path, a computer running the drawing application generates a subdivision of the first path. The computer then distributes the drawing objects over a second path, the second path being based on the subdivision of the first path. The computer then places the drawing objects on the second path. The computer then generates the mapping table that identifies a location of a drawing object on the second path and a respective subdivision of the first path.

20 Claims, 7 Drawing Sheets

| Drawing ID | Position on Second Path | Segment on First Path |
|---|---|---|
| 1 | 0.167 | P1-P2 |
| 2 | 0.5 | P4-P5 |
| 3 | 0.867 | P(n-2)-P(n-1) |

Mapping Table 430

ARRANGEMENT OF DRAWING OBJECTS ALONG ARBITRARY PATHS

TECHNICAL FIELD

This description relates to placing drawing objects along arbitrary paths in computer drawing applications.

BACKGROUND

Some computer-based drawing applications provide controls that enable a user to place drawing objects on a display. Examples of drawing objects include shapes, cartoons, and imported pictures such as photographs. In conventional approaches to placing drawing objects on a display with a drawing application, a user of a drawing application specifies that certain drawing objects be aligned with respect to a position on each drawing object. In one example, the user may specify that the centers of the drawing objects are aligned vertically. In another example, the user may specify that the top lefts of the drawing objects are aligned horizontally.

SUMMARY

In one general aspect, a method can include receiving, by processing circuity configured to display drawing objects on a display device, (i) drawing object data representing a set of drawing objects and (ii) first path data representing a first path displayed on the display device. The method can also include generating, by the processing circuitry, subdivision data representing a subdivision of the path, the subdivision of the first path including a plurality of subdivided paths, each of the plurality of subdivided paths including a respective pair of endpoints. The method can further include performing, by the processing circuitry, a drawing object positioning operation to produce position data indicating a respective position of each of the set of drawing objects on a second path, the second path being based on the plurality of subdivided paths. The method can further include generating, by the processing circuitry, a mapping table including a set of entries, each of the set of entries including (i) a respective drawing object identifier identifying a drawing object of the set of drawing objects, (ii) the position data indicating the position of the drawing object on the second path, and (iii) a subdivision indicator indicating a respective subdivided path of the plurality of subdivided paths. The method can further include displaying, by the processing circuitry on the display device, the set of drawing objects positioned on the first path according to the mapping table.

The details of one or more implementations are set forth in the accompanying drawings and the description below. Other features will be apparent from the description and drawings, and from the claims.

DETAILED DESCRIPTION

Figure 1:
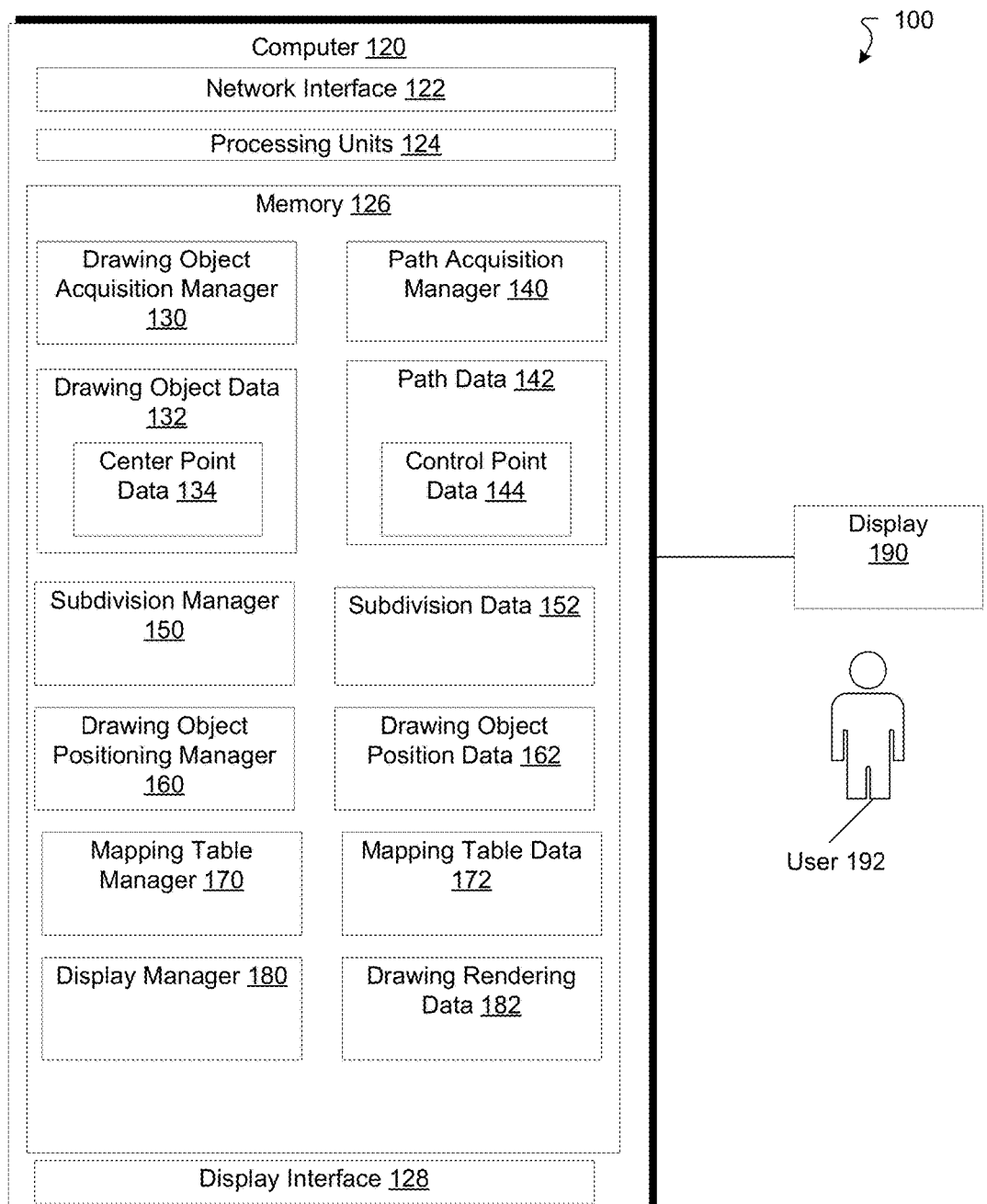
FIG. 1 is a diagram illustrating an example electronic environment in which improved techniques described herein may be implemented.

The above-described conventional approaches to placing drawing objects on a display with a drawing application limit the placement of drawing objects to horizontal and vertical lines. There is currently no way to automatically place an arbitrary group of drawing objects along a generic path such as a cubic Bezier curve in a drawing application. Further, the conventional approaches to placing drawing objects on a display with a drawing application also do not allow an automatic orientation of the drawing objects along a direction defined by an arbitrary path.

Consider a scenario in which a group of drawing objects are to be arranged along a curve. In the above-described conventional approaches to placing drawing objects on a display with a drawing application, a user might drag each drawing object to place that drawing object at a respective position along the curve. The placement of these drawing objects along the curve is burdensome and error-prone. For example, it is difficult for the user to judge whether the drawing objects are placed uniformly over the curve, as distances may be difficult to measure along the curve. Thus, simple placement of drawing objects along a curve is difficult for a user to do well and efficiently.

Moreover, in many situations, the user may want to orient drawing objects with a direction indicated by the curve at each drawing object position. In one example, the user may wish to orient each drawing object parallel to a tangent to the curve at its position on the curve. In another example, the user may wish to orient each drawing object parallel to a normal to the curve at its position on the curve. Beside the additional tedium of orienting each drawing object by hand, it is very difficult for the user to orient the drawing objects in a direction parallel to a curve's tangent or normal with any accuracy.

There are deficiencies to conventional approaches to aligning a text object (e.g., a line of text) to a specified curve (e.g., a Bezier curve) in a drawing application. For example, while some approaches can align one text object with a curve, when there are multiple text objects (e.g., multiple lines of text), those approaches require a different curve for each text object. Furthermore, while some approaches can align text to curves, it is a challenge use those approaches to orient arbitrary drawing objects along specified curves. Specifically, when a user attempts to use those approaches to align a drawing object to a curve, the user must define the drawing object as a new font. Because font glyphs are uniformly colored, the drawing object will become monochromatic if it is multi-colored. Accordingly, a different approach is needed to orient multiple, arbitrary drawing objects along a single, complex curve.

In this context, a "drawing object" is any set of lines, curves, points, and basic shapes (e.g., rectangles, arcs, circles, and ellipses) that are grouped together to form a single graphical element in a drawing application. In some implementations, a drawing object may be generated manually by a user using drawing tools in the drawing application. In some implementations, a drawing object may be generated in whole or in part using existing graphical elements (e.g., from on online library, photographs in a local folder, etc.). In some implementations, a drawing object can have multiple colors. Because a drawing object can include many arbitrary drawing elements, aligning a drawing object with an arbitrary curve introduces challenges above and beyond those encountered when aligning text to a simple curve.

In accordance with the implementations described herein and in contrast to the above-described conventional approaches to displaying drawing objects in a drawing application, improved techniques of displaying drawing objects in a drawing application include generating a mapping table between points on a first path and a group of line segments along which drawing objects may be placed. Given the first path, a computer running the drawing application generates a subdivision of the first path. The computer then distributes the drawing objects over a second path, the second path being based on the subdivision of the first path. In some implementations, the subdivision of the first path results in a set of line segments connecting points on the first path defining the subdivision, and the computer produces the second path by concatenating the line segments to form, as the second path, a line. The computer then places the drawing objects on the second path. In some implementations, the computer distributes the drawing objects uniformly over the second path. In some implementations, the computer distributes the respective centers of the drawing objects uniformly over the second path. The computer then generates the mapping table that identifies a location of a drawing object on the second path and a respective subdivision of the first path. In some implementations, the computer identifies a location on the first path based on the location of the drawing object on the second path and the subdivision. In some implementations, the location on the first path is the closest point of the first path to the line segment along which the center of the object is located.

Advantageously, such a mapping table enables the automatic placement of multiple, arbitrary drawing objects along the specified path. Further, the drawing objects may be oriented with respect to a tangent to the curve at points closest to the mapped line segments that approximate the specified path. In this way, a user may automatically place any number of arbitrarily complex drawing objects along any specified curve with complete control as to the nature of the placement (e.g., with respect to centers, tops, or bottoms of drawing objects). This is in contrast to the conventional approaches which are either constrained to the alignment of text along simple curves or the manual placement of more complex drawing objects along curves, the latter of which is error-prone and burdensome.

In some implementations, the first path is a cubic Bezier curve. In some implementations, the subdivision of the first path is a De Casteljau subdivision.

In some implementations when the second path is a line and subdivided paths defined by the subdivision are line segments, the sum of lengths of the subdivided paths are equal to a length of the line.

In some implementations, when the mapping table specifies a position along the line at which the center of the object is placed, the computer generates a position of the center of the drawing object along the line segment and, based on this position, produces a position of the drawing object along the first path.

In some implementations, the computer rotates the drawing object based on a tangent line at the position of the center of the drawing object on the first path. In some implementations, when the first path is a cubic Bezier curve, the computer performs the rotation by performing a Bezier curve inversion operation on the subdivided path to produce an intercept at which the drawing object lies on a cubic Bezier curve defined by the subdivided path, and then generating, as the tangent line to the first path at the position of the drawing object on the first path, a tangent line to the cubic Bezier curve defined by the subdivided path at the intercept.

In some implementations, the first path is a closed curve. In such implementations, the computer, when positioning a drawing object near or at an endpoint of the second path, moves the drawing object some specified distance away from that endpoint.

The following definitions are used for clarity in the discussion hereinafter. A Bezier curve is a smooth curve defined by a set of control points and coefficients of the set of control points such that each of the set of coefficients depends on a real parameter and the sum of the coefficients is equal to one. A cubic Bezier curve is a Bezier curve such that each of the set of coefficients is a cubic polynomial in the real parameter. A De Casteljau subdivision of a Bezier curve is a process by which a Bezier curve may be split into two Bezier curves at a point on the Bezier curve corresponding to a value of the real parameter.

FIG. 1 is a diagram that illustrates an example electronic environment 100 in which the above-described improved techniques may be implemented. As shown, in FIG. 1, the electronic environment 100 includes a computer 120 and a display 190 viewed by a user 192.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a drawing object acquisition manager 130, a path acquisition manager 140, a subdivision manager 150, a drawing object positioning manager 160, a mapping table manager 170, and a display manager 180. Further, as illustrated in FIG. 1, the memory 126 is configured to store various data, which is described with respect to the respective managers that use such data.

The drawing object acquisition manager 130 is configured to obtain drawing object data 132 representing a set of drawing objects that may be displayed on the display device 190. In some implementations, the drawing object acquisition manager 130 is configured to generate the drawing object data 132 in response to a drawing object being created by the user 192 on the display device 190. In some implementations, the drawing object acquisition manager 130 is configured to receive the drawing object data 132 from an external source, e.g., a network, a storage medium, and the like.

The drawing object data 132 includes data that represents one or more drawing objects. In some implementations, the drawing object data 132 includes data in a PNG, JPEG, bitmap, or other graphic format. In some implementations, the drawing object data 132 is in a scalar or vector format proprietary to the drawing application. In some implementations, a drawing object represented by the drawing object data 132 has a maximum extent that is significantly smaller than a local radius of curvature of a path onto which that drawing object is to be placed. In some implementations, such as the example illustrated in FIG. 1, the drawing object data 132 includes center point data 134 representing a location of a center of a drawing object. In some implementations, the drawing object data 132 also includes data representing other points of interest of a drawing object such as a top left, top center, top right, middle left, middle right, bottom left, bottom center, and bottom right.

The path acquisition manager 140 is configured to obtain path data 142 representing a path that may be displayed on the display device 190. In some implementations, the path acquisition manager 140 is configured to generate the path data 142 in response to a path such as a curve, a series of arcs, a hand-drawn path, and the like, being created by the user 192 on the display device 190. In some implementations, the path acquisition manager 140 is configured to receive the path data 142 from an external source, e.g., a network, a storage medium, and the like.

The path data 142 includes data that represents a path as drawn and displayed on the display device 190. In some implementations, the path data 142 may include a discrete set of numbers that define a path having a specific mathematical form. In some implementations, each path represented by the path data 142 is defined by eight numbers that in turn define four control points of a cubic Bezier curve. In some implementations, the path data 142 represents any number of control points of a Bezier curve of arbitrary degree. In some implementations, the path data 142 represents control points of a rational Bezier curve. In some implementations, the path data 142 represents a set of points that lie on a given curve.

Figure 2:
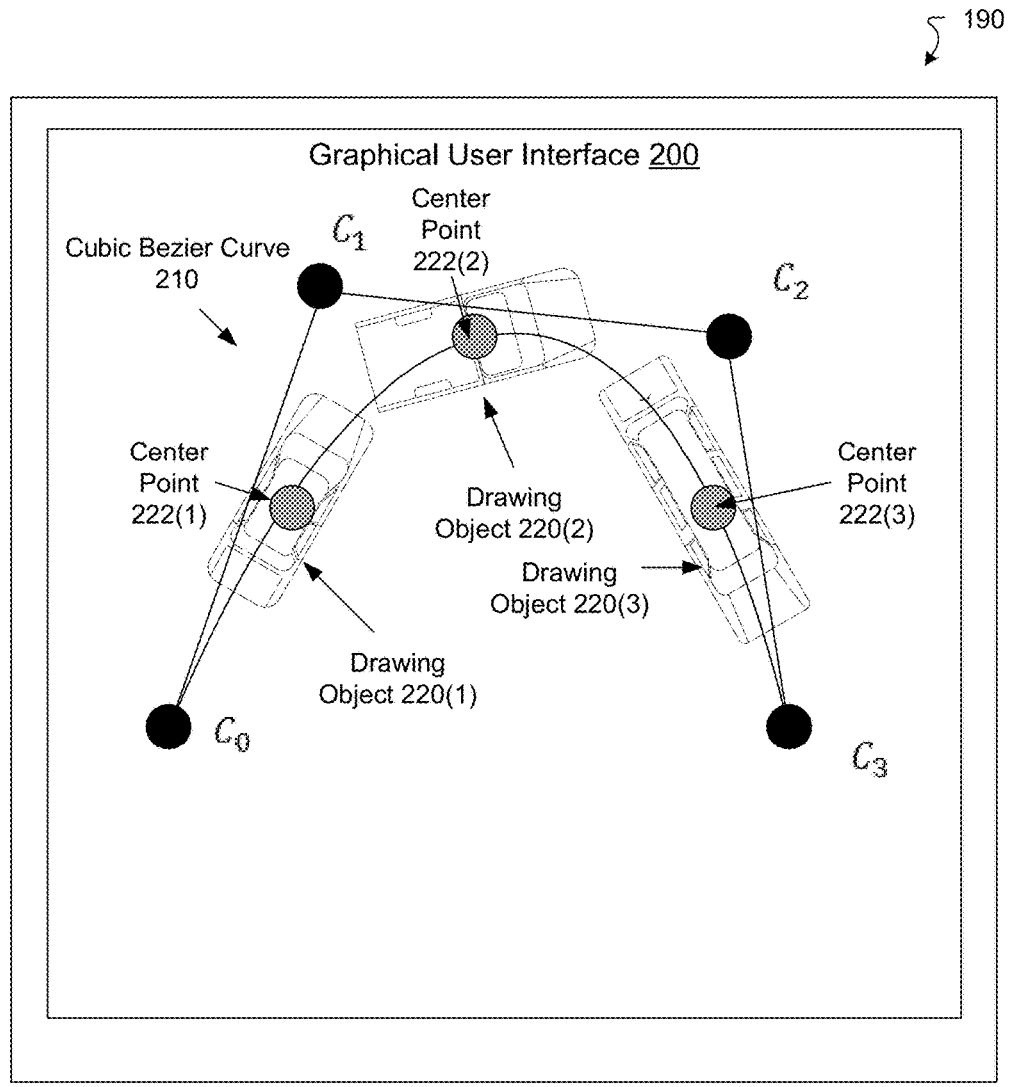
FIG. 2 is a diagram illustrating an example GUI in which drawing objects are arranged on a cubic Bezier curve, displayed on a display device within the electronic environment shown in FIG. 1.

FIG. 2 illustrates an example graphical user interface (GUI) 200 containing an application window in which a cubic Bezier curve 210 represented by the path data 142 and drawing objects 220(1), 220(2), and 220(3) represented by the drawing object data 132 are shown. The illustration in FIG. 2 shows an example output of the improved techniques demonstrated herein. Here, the drawing objects 220(1), 220(2), and 220(3) are arranged on the cubic Bezier curve 210 and oriented with respect to the curve in the neighborhood of the point at which each respective drawing object 220(1), 220(2), and 220(3) is placed.

The cubic Bezier curve 210, as shown in FIG. 2, is defined by four control points $C_0$, $C_1$, $C_2$, and $C_3$. The Cubic Bezier curve 210 may be represented in mathematical form in terms of the four control points as a function C: $\mathbb{R} \to \mathbb{R}^2$ as follows:

$$C(t)=(1-t)^3 C_0+3t(1-t)^2 C_1+3t^2(1-t)C_2+t^3 C_3,$$

where, in some implementations, $t \in [0,1]$. Nevertheless, in some implementations, t may lie outside of this domain.

Each of the drawing objects 220(1), 220(2), and 220(3) has a respective center point 222(1), 222(2), and 222(3) that approximately lies on the curve 210. In some implementations, the center point 222(1) of the drawing object 220(1) is an average of points on the boundary of the drawing object 220(1), and similar for the other center points 222(2) and 222(3). In some implementations, the center points 222(1), 222(2), and 222(3) are each user-specified.

As mentioned above, FIG. 2 illustrates an output of the improved techniques disclosed herein. Nevertheless, to start, the drawing objects 220(1), 220(2), and 220(3) and the curve 210 may be shown separately. Discussion hereinafter is directed to an example process of placing the drawing objects 220(1), 220(2), and 220(3) on the curve 210 as shown the GUI 200.

Returning to FIG. 1, the subdivision manager 150 is configured to produce subdivision data 152 that represents a subdivision of the oath represented by the path data 142. In some implementations, the subdivision manager 150 is configured to use a De Casteljau subdivision process to produce the subdivision data 152. Generally, a De Casteljau subdivision of a cubic Bezier curve, e.g., the cubic Bezier curve 210, involves introducing two new sets of control points such that the first control point of a first set is the same as the first original control point, the fourth control point of a second set is the same as the fourth original control point, and that the fourth control point of the first set is the same as the first control point of the second set. This subdivision process may be repeated recursively to generate new sets of control points and points on the original Bezier curve that are the points at which the curve has been subdivided. The subdivision data 152 includes these new control points and subdivision points.

The drawing object positioning manager 160 is configured to produce drawing object positioning data 162 that represents positions of the drawing objects represented by the drawing object data 132 along a second path. In some implementations, the drawing object positioning data 162 represents positions of the centers 134 of the drawing objects.

To accomplish this positioning, the drawing object positioning manager 160 is configured to store in memory (not necessarily for display) data representing the second path. In some implementations, the second path is a line. In some implementations, the line has a length equal to the sum of the lengths of line segments defined by the subdivision points of the subdivision data 152. Further detail of such a second path is discussed with respect to FIG. 4B. In some implementations, the second path is another curve, e.g., a circle, that may be easily rectified. In any case, the second path is based on the subdivision data 152.

Once the second path has been defined, the drawing object positioning manager 160 is configured to place the drawing objects represented by the drawing object data 132 on the second path in a specified arrangement. In some implementations, when the second path is a line, the drawing object positioning manager 160 may be configured to place the drawing objects at uniform intervals along the line. In some implementations, the drawing object positioning manager 160 is configured to distribute the centers of the drawing objects uniformly over the line. In this case, the drawing object position data then includes identifiers of each object and corresponding positions of each object along the line.

The mapping table manager 170 is configured to produce mapping table data 172 that represents a mapping between a drawing object's position on the second path and a subdivision of the first path. In some implementations, when the second path is a line, the mapping table data 172 includes an identifier identifying a drawing object, a distance along the line at which the drawing object, e.g., its center is located, and a line segment along which the drawing object, e.g., its center, is located. Further details of the mapping table data 172 are discussed with respect to FIG. 4D.

The display manager 180 is configured to produce drawing rendering data 182 that represents the drawing objects as placed on the first path and rendered for viewing on the display device 190. In some implementations, the display manager 180 is also configured to perform a rotation operation on each drawing object as placed according to the mapping table data 172. In some implementations, the rotation operation aligns each drawing object with a tangent to the first path at a point in the vicinity of the point at which the drawing object is placed. In some implementations, the rotation operation aligns each drawing object with a normal to the first path at a point in the vicinity of the point at which the drawing object is placed.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an drawing object acquisition manager 130 (and/or a portion thereof), a path acquisition manager 140 (and/or a portion thereof), a subdivision manager 150 (and/or a portion thereof), a drawing object positioning manager 160 (and/or a portion thereof), a mapping table manager 170 (and/or a portion thereof), and a display manager 180 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including drawing object data 132, path data 142, subdivision data 152, drawing object position data 162, mapping table data 172, and drawing rendering data 182.

Figure 3:
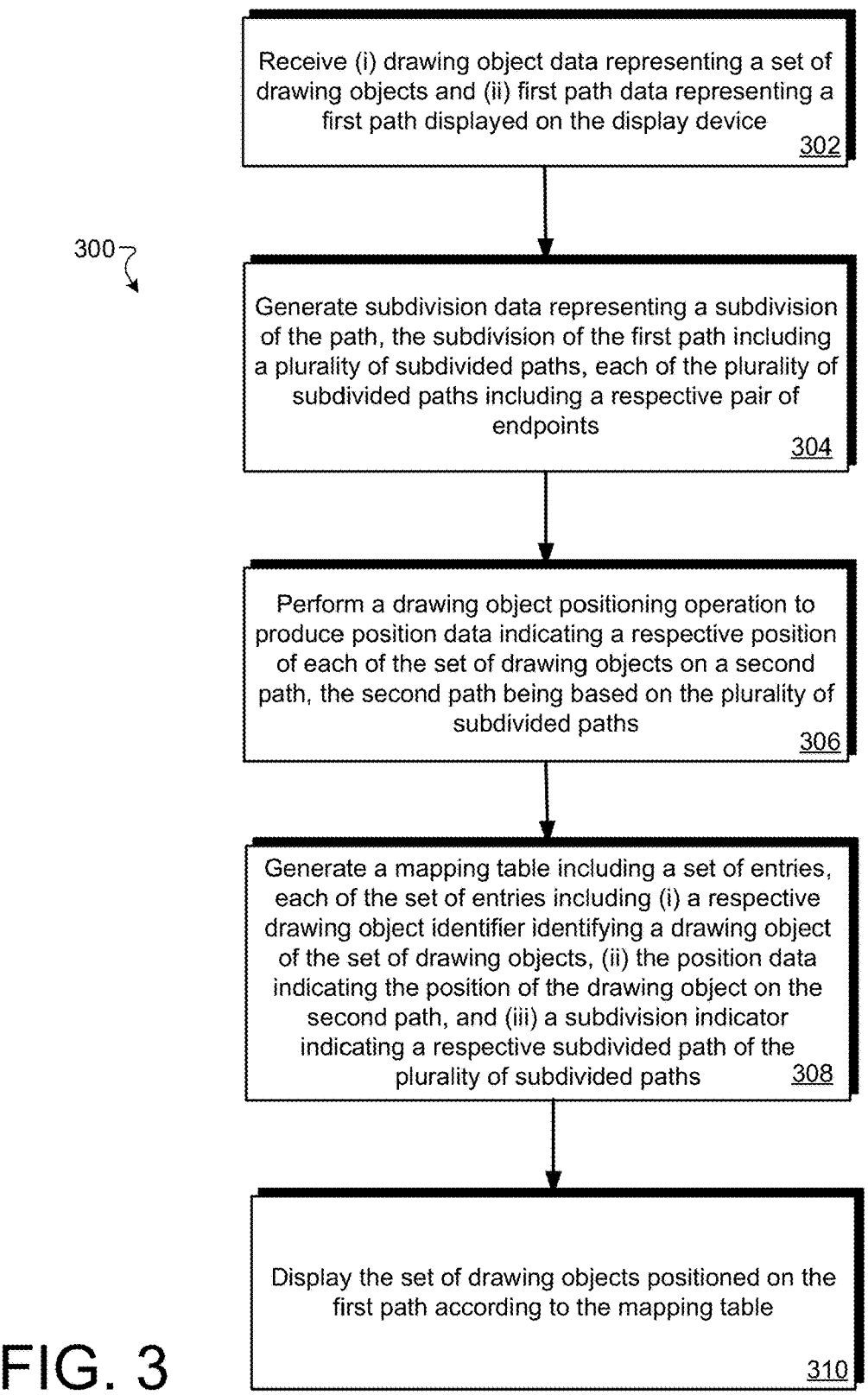
FIG. 3 is a flow chart illustrating an example method of implementing the improved techniques as shown in the electronic environment in FIG. 1.

FIG. 3 is a flow chart depicting an example method 300 of displaying drawings on a display device. The method 300 may be performed by software constructs described in connection with FIG. 1, which reside in memory 126 of the computer 120 and are run by the set of processing units 124.

At 302, each of the drawing object acquisition manager 130 and the path acquisition manager 140 respectively receives (i) drawing object data 132 representing a set of drawing objects and (ii) first path data 142 representing a first path displayed on the display device 190.

At 304, the subdivision manager 150 generates subdivision data 152 representing a subdivision of the path. The subdivision of the first path includes a plurality of subdivided paths. Each of the plurality of subdivided paths includes a respective pair of endpoints.

At 306, the drawing object positioning manager 160 performs a drawing object positioning operation to produce position data 162 indicating a respective position of each of the set of drawing objects on a second path. The second path is based on the plurality of subdivided paths.

At 308, the mapping table manager 170 generates a mapping table 172 including a set of entries. Each of the set of entries includes (i) a respective drawing object identifier identifying a drawing object of the set of drawing objects, (ii) the position data indicating the position of the drawing object on the second path, and (iii) a subdivision indicator indicating a respective subdivided path of the plurality of subdivided paths.

At 310, the display manager displays, on the display device, the set of drawing objects positioned on the first path according to the mapping table.

FIGS. 4A-4D are diagrams illustrating an example process of generating a mapping table to place drawing objects along a first path.

Figure 4A:
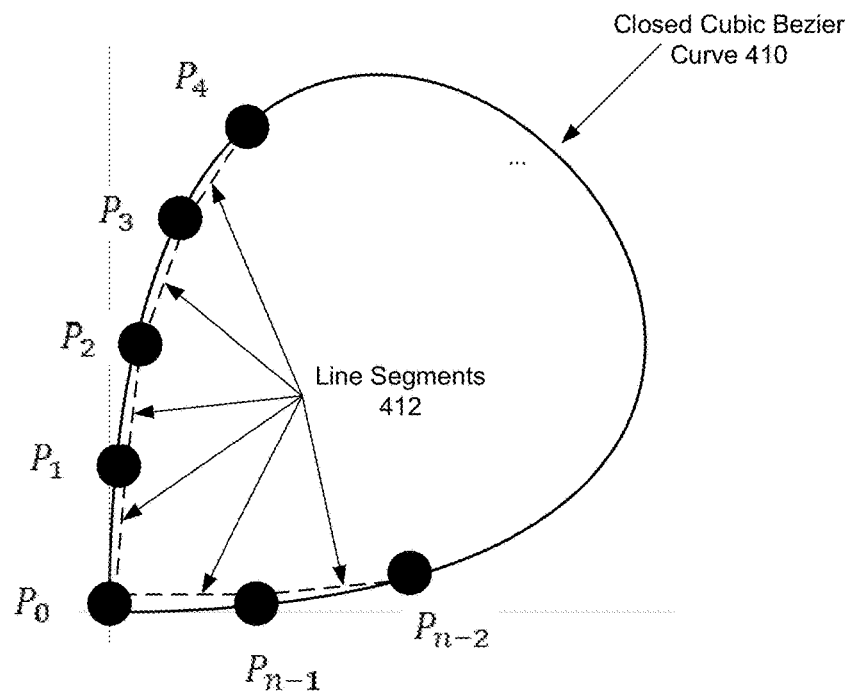
FIG. 4A is a diagram illustrating an example subdivision of a cubic Bezier curve into line segments.

FIG. 4A is a diagram illustrating an example subdivision of a cubic Bezier curve 410. In the specific example illustrated in FIG. 4A, the curve 410 is closed so that its start point $P_0$ and end point $P_n$ are the same. It is assumed in FIG. 4A that there has been a subdivision operation performed on the curve 410 to produce the subdivision points $P_1$, $P_2$, $P_3$, $P_4$, . . . , $P_{n-2}$, and $P_{n-1}$. In some implementations, the subdivision operation is a De Casteljau subdivision.

FIG. 4A also illustrates line segments 412 that may be constructed from the subdivision points $P_1$, $P_2$, $P_3$, $P_4$, . . . , $P_{n-2}$, and $P_{n-1}$. The line segments 412 may be denoted as $\overline{P_0P_1}$, $\overline{P_1P_2}$, . . . , $\overline{P_{n-1}P_n}$. When the number of subdivisions n is large enough, the line segments 412 lie sufficiently close to the curve 410, e.g., with less than 5% error.

Figure 4B:
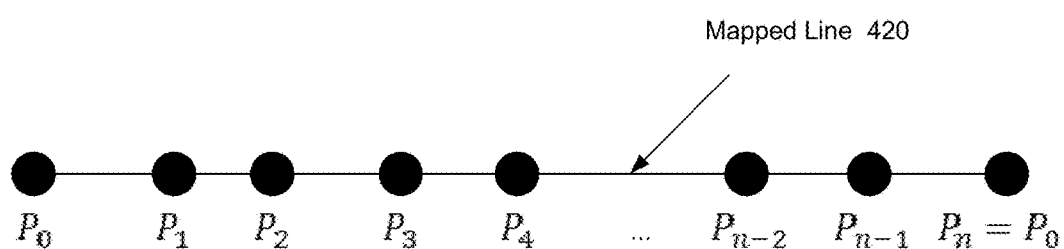
FIG. 4B is a diagram illustrating an example line onto which the subdivision is laid out.

FIG. 4B is a diagram illustrating an example line 420 that serves as a second path onto which the drawing objects may be arranged. The line 420 is a logical line rather than one to be rendered for display by the display manager 180. As mentioned above, the second path does not have to be a line but instead may be any specified path that is easily rectifiable such as a circle.

The line 420 is formed by concatenating the line segments 412 end to end to form a line $\overline{P_0P_1P_2...P_n}$, where $P_n=P_0$ because the curve 410 is closed. Accordingly, the length of the line 420 is equal to the sum of the lengths of the line segments $\overline{P_0P_1}, \overline{P_1P_2}, \ldots, \overline{P_{n-1}P_n}$. These line segments do not have the same length and, accordingly, the points $P_1, P_2, P_3, P_4, \ldots, P_{n-2}$, and $P_{n-1}$ are not evenly distributed over the line 420.

Figures 4C, 4D:
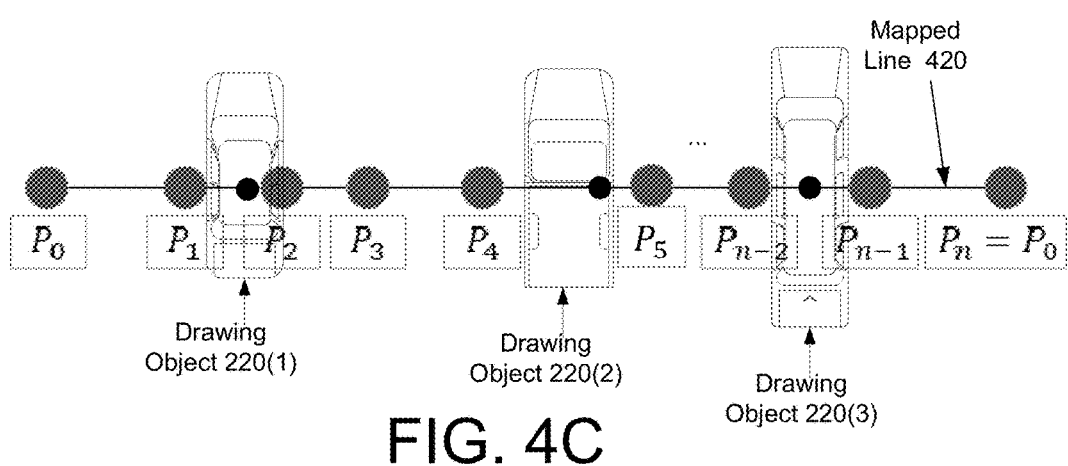
FIG. 4C is a diagram illustrating an example uniform placement of the drawing objects along the line.
FIG. 4D is a diagram illustrating an example mapping table defining a mapping between a placement of a drawing object along the line and a respective line segment subdivision.

FIG. 4C is a diagram illustrating an example placement of the drawing objects 220(1), 220(2), and 220(3) on the line 420. As shown in FIG. 4C, the centers of the drawing objects 220(1), 220(2), and 220(3) are placed according to a specified distribution. In some implementations, the centers of the drawing objects 220(1), 220(2), and 220(3) are distributed uniformly over the line 420.

Because the curve 410 is closed, in some implementations, the drawing object positioning manager 160 is configured to move any drawing object away from the points $P_0$ or $P_n$ when the centers of the drawing objects are too close to those points, e.g., less than a width of the drawing object from the points $P_0$ or $P_n$.

As shown in FIG. 4C, the drawing objects 220(1), 220(2), and 220(3) are placed such that the shorter dimensions lie parallel to the line 420. In some implementations, a longer dimension may lie parallel to the line 420 in this initial placement of the drawing objects 220(1), 220(2), and 220(3).

FIG. 4D illustrates an example mapping table 430 that represents a mapping between a position on the line 420 and a line segment. As shown in the mapping table 430, the drawing object 220(1) lies on the segment $\overline{P_1P_2}$, the drawing object 220(2) lies on the segment $\overline{P_4P_5}$, and the drawing object 220(3) lies on the segment $\overline{P_{n-2}P_{n-1}}$. Using this mapping table, the display manager 180 may show the drawing objects 220(1), 220(2), and 220(3) on the display device 190 along the line segments $\overline{P_0P_1}, \overline{P_1P_2}, \ldots \overline{P_{n-1}P_n}$ at the curve 410.

In some implementations, the mapping table 430 also has information describing a position along a line segment 412 at which a center of a drawing object is located. For example, knowing the position of the center along the line 420 and the lengths of the line segments $\overline{P_0P_1}$ and $\overline{P_1P_2}$, the mapping table manager 170 can generate a location along the line segment $\overline{P_1P_2}$ at which the center of the drawing object 220(1) is located.

Figure 5:
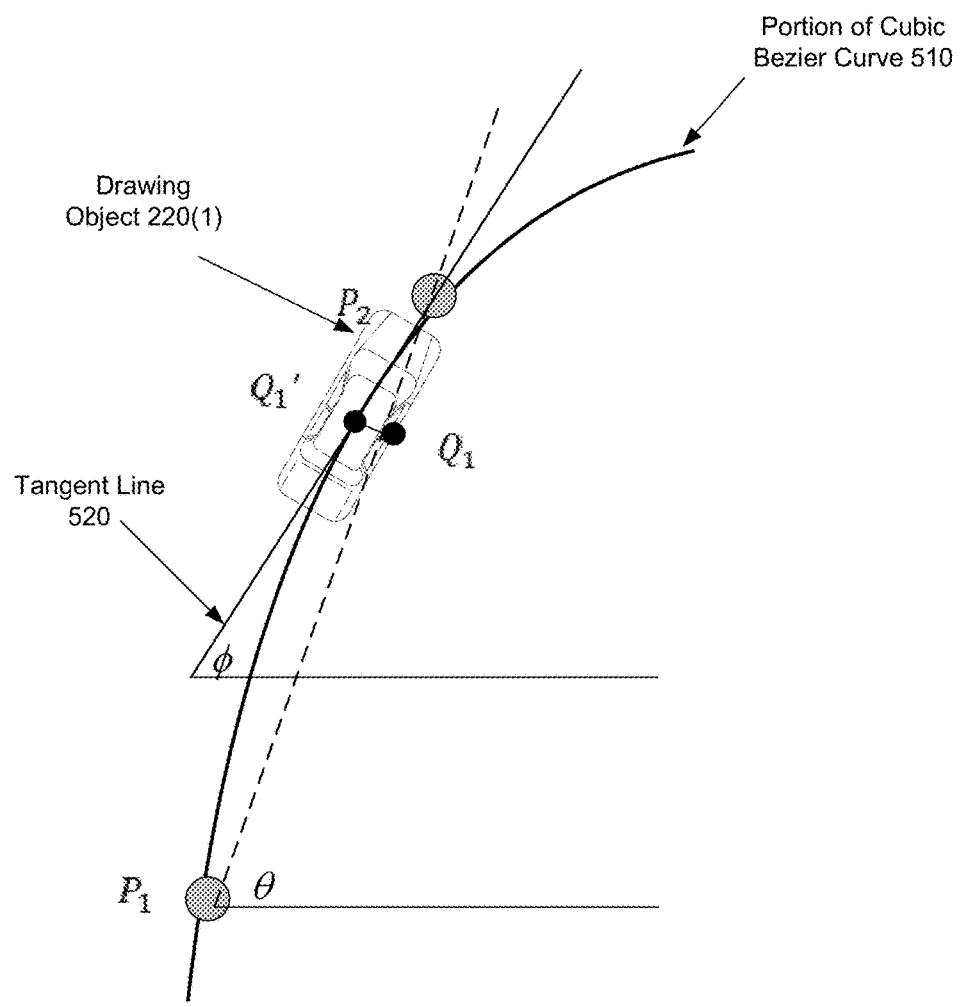
FIG. 5 is a diagram illustrating an example orientation of a drawing object arranged on a cubic Bezier curve.

FIG. 5 illustrates an example placement of the drawing object 220(1) along the curve 510 based on the mapping table 430. The center of the drawing object 220(1) is initially at the point $Q_1$ on the line segment $\overline{P_1P_2}$. The display manager 180 has also oriented the drawing object 220(1) so that the long dimension of the drawing object 220(1) lies parallel to the line segment $\overline{P_1P_2}$.

FIG. 5 further illustrates an example rotation operation performed by the display manager 180 on the drawing object 220(1) to produce an orientation of the drawing object 220(1) such that the drawing object 220(1) is aligned with a tangent line 520 to the curve portion 510 of the curve 210. In some implementations, the following algorithm carried out by the display manager 180 to effect the rotation operation is used to reduce the chances of floating point errors in locating an appropriate point on the curve 510 at which to generate the tangent line 520.

First, once the proper line segment on which the drawing object 220(1) has been identified using the mapping table 430, the display manager 180 determines a value of an intercept t on the curve portion 510 on which the center of the drawing object 220(1) lies. To recall, this cubic Bezier portion 510 is defined mathematically as $$C(t)=(1-t)^3C_0+3t(1-t)^2C_1+3t^2(1-t)C_2+t^3C_3,$$

where, in this case, $C_0$ and $C_3$ are endpoints of the curve 510, and $C_1$ and $C_2$ are control points of the curve 510 that do not lie on the curve 510. In some implementations, the display manager 180 finds the intercept t by performing a Bezier curve inversion operation. This operation involves defining a coordinate system in which the points and curves are located relative to an origin, determining the coordinates of the point $Q_1$ in the coordinate system, and then solving the above equation for the intercept t by setting C(t) equal to the point $Q_1$. Because the point $Q_1$ does not lie exactly on the curve 510, the result is an approximate point $Q_1'$ on the curve 510 that corresponds to the intercept t. In some implementations, the display manager 180 moves the center of the drawing object 220(1) to the point $Q_1'$ and oriented parallel to the line segment $\overline{P_1P_2}$.

Second, the display manager 180 finds the tangent line 520 at the point $Q_1'$ on the curve 510 by evaluating the derivative of the above equation for the curve 510 at the intercept t:

$$C'(t)=-3(1-t)^2C_0+3(1-t)(1-3t)C_1+3t(2-3t)C_2+3t^2C_3.$$

The display manager 180 may then find the unit tangent vector, i.e., the tangent direction, at the point $Q_1'$ by dividing the above expression by its Cartesian magnitude.

Third, the display manager 180 computes the direction of the unit tangent vector or tangent line 520 using the following expression:

$$\phi=a\tan 2(C'(t)_y, C'(t)_x),$$

where $C'(t)_y$, $C'(t)_x$ are, respectively, the vertical and horizontal components of the tangent line 520, and a tan 2 is the arctangent function with range $\in[-\pi, \pi]$. When the line segment $\overline{P_1P_2}$ is oriented at an angle $\theta$ with respect to the horizontal axis as shown in FIG. 5, the display manager 180 rotates the drawing object 220(1) by an angle $\phi-\theta$. In this way, the drawing object 220(1) is oriented parallel to the tangent line 520 at the point $Q_1'$ on the curve portion 510.

In some implementations, the orientation of the drawing object 220(1) may also depend on the local curvature of the curve 510 at the point $Q_1'$. For example, when the drawing object 220(1) is oriented along a normal to the curve 510, then the curvature of the curve 510 may affect whether the 220(1) points away from or toward the center of curvature of the curve.

Figure 6:
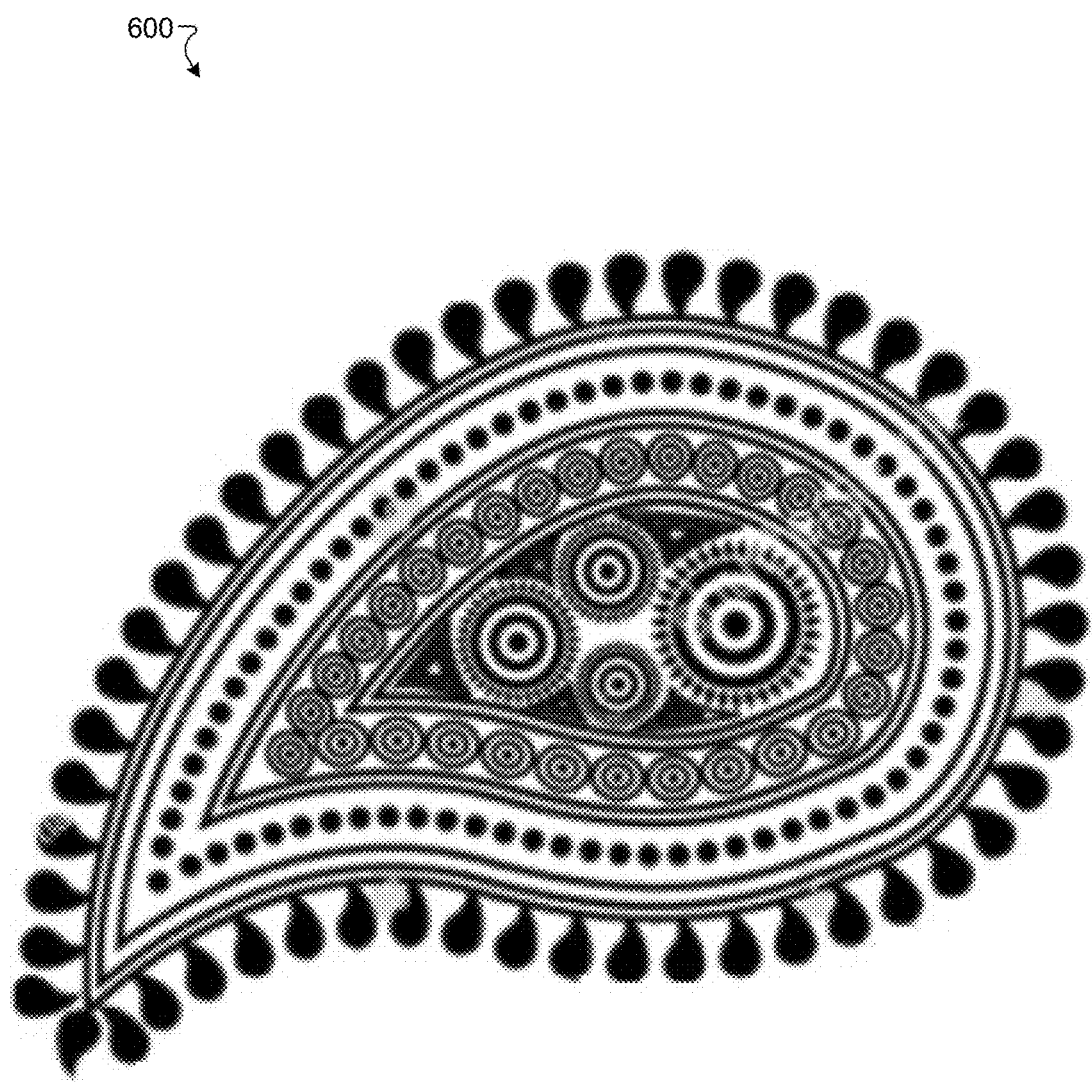
FIG. 6 is a diagram illustrating an example drawing object made from other drawing objects placed on various curves.

FIG. 6 is a diagram illustrating an example drawing object 600 on which there are numerous drawing objects and paths about which the numerous drawing objects are placed on the paths and oriented according to local normals to the paths.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by processing circuitry configured to display drawing objects on a display device, (i) drawing object data representing a set of drawing objects and (ii) first path data representing a first path displayed on the display device;
   generating, by the processing circuitry, subdivision data representing a subdivision of the path, the subdivision of the first path including a plurality of subdivided paths, each of the plurality of subdivided paths including a respective pair of endpoints;
   performing, by the processing circuitry, a drawing object positioning operation to produce position data indicating a respective position of each of the set of drawing objects on a second path, the second path being based on the plurality of subdivided paths;
   generating, by the processing circuitry, a mapping table including a set of entries, wherein one of the set of entries includes (i) a drawing object identifier identifying a drawing object of the set of drawing objects, (ii) the position data indicating the position of the drawing object on the second path, and (iii) a subdivision indicator indicating a subdivided path of the plurality of subdivided paths; and
   displaying, by the processing circuitry on the display device, the set of drawing objects positioned on the first path according to the mapping table.

2. The method of claim 1, wherein the first path is a cubic Bezier curve.

3. The method of claim 2, wherein generating the subdivision data includes:
   performing a De Casteljau subdivision operation on the first path to produce the subdivision data.

4. The method of claim 2, wherein the second path is a line.

5. The method of claim 4, wherein one of the plurality of subdivided paths is a line segment, a sum of lengths of the plurality of subdivided paths being equal to a length of the line.

6. The method of claim 2, wherein the subdivision indicator further indicates a position of the drawing object along the first path, and
   wherein generating the mapping table includes:
   generating a distance of a drawing object of the set of drawing objects from an endpoint of a subdivided path of the set of subdivided paths; and
   producing a position of the drawing object on the first path based on the distance of the drawing object from the endpoint of the subdivided path.

7. The method of claim 6, wherein displaying the set of drawing objects positioned on the first path according to the mapping table includes:
   performing a drawing object orientation operation to produce an orientation of the drawing object relative to a tangent line to the first path at the position of the drawing object on the first path.

8. The method of claim 7, wherein performing the drawing object orientation operation includes:
   performing a Bezier curve inversion operation on the subdivided path to produce an intercept at which the drawing object lies on a cubic Bezier curve defined by the subdivided path;
   generating, as the tangent line to the first path at the position of the drawing object on the first path, a tangent line to the cubic Bezier curve defined by the subdivided path at the intercept; and
   performing a rotation operation on the drawing object to rotate the drawing object by an angle defined by an orientation of the tangent line to the cubic Bezier curve defined by the subdivided path at the intercept.

9. The method of claim 6, wherein the second path intersects the drawing object at a center of the drawing object, and
   wherein producing the position of the drawing object on the first path includes:
   generating a point on the first path nearest to the center of the drawing object.

10. A computer program product comprising a non-transitory storage medium, the computer program product including code that, when executed by processing circuitry of a computer configured to display drawing objects on a display device, causes the processing circuitry to perform a method, the method comprising:
    receiving (i) drawing object data representing a set of drawing objects and (ii) first path data representing a first path displayed on the display device;
    generating subdivision data representing a subdivision of the path, the subdivision of the first path including a plurality of subdivided paths, each of the plurality of subdivided paths including a respective pair of endpoints;
    performing a drawing object positioning operation to produce position data indicating a respective position of each of the set of drawing objects on a second path, the second path being based on the plurality of subdivided paths;
    generating a mapping table including a set of entries, wherein one of the set of entries includes (i) a drawing object identifier identifying a drawing object of the set of drawing objects, (ii) the position data indicating the position of the drawing object on the second path, and (iii) a subdivision indicator indicating a subdivided path of the plurality of subdivided paths; and
    displaying, on the display device, the set of drawing objects positioned on the first path according to the mapping table.

11. The computer program product as in claim 10, wherein performing the drawing object positioning operation includes:
  distributing the set of drawing objects uniformly over the second path.

12. The computer program product of claim 10, wherein the first path is closed.

13. The computer program product of claim 12, wherein the second path has an endpoint; and
  wherein performing the drawing object positioning operation includes:
    generating, as a position of a drawing object of the set of drawing objects on the second path, a point in a vicinity of the endpoint of the second path; and
    in response to generating the point in the vicinity of the endpoint, performing a drawing object position change operation to adjust the position data, the position data indicating that the drawing object is a specified distance from the endpoint.

14. The computer program product of claim 10, wherein the first path is a cubic Bezier curve.

15. The computer program product of claim 14, wherein the second path is a line.

16. An electronic apparatus configured to display drawing objects on a display device, the electronic apparatus comprising:
  a network interface;
  a memory; and
  controlling circuitry coupled to the memory, the controlling circuitry being configured to:
    receive (i) drawing object data representing a set of drawing objects and (ii) first path data representing a first path displayed on the display device;
    generate subdivision data representing a subdivision of the path, the subdivision of the first path including a plurality of subdivided paths, each of the plurality of subdivided paths including a respective pair of endpoints;
    perform a drawing object positioning operation to produce position data indicating a respective position of each of the set of drawing objects on a second path, the second path being based on the plurality of subdivided paths;
    generate a mapping table including a set of entries, wherein one of the set of entries includes (i) a drawing object identifier identifying a drawing object of the set of drawing objects, (ii) the position data indicating the position of the drawing object on the second path, and (iii) a subdivision indicator indicating a subdivided path of the plurality of subdivided paths; and
    display, on the display device, the set of drawing objects positioned on the first path according to the mapping table.

17. The electronic apparatus of claim 16, wherein the first path is a cubic Bezier curve.

18. The electronic apparatus of claim 17, wherein the subdivision indicator further indicates a position of the drawing object along the first path, and
  wherein the controlling circuitry configured to generate the mapping table is further configured to:
    generate a distance of a drawing object of the set of drawing objects from an endpoint of a subdivided path of the set of subdivided paths; and
    produce a position of the drawing object on the first path based on the distance of the drawing object from the endpoint of the subdivided path.

19. The electronic apparatus of claim 18, wherein the controlling circuitry configured to display the set of drawing objects positioned on the first path according to the mapping table is further configured to:
  perform a drawing object orientation operation to produce an orientation of the drawing object relative to a tangent line to the first path at the position of the drawing object on the first path.

20. The electronic apparatus of claim 18, wherein the second path intersects the drawing object at a center of the drawing object, and
  wherein the controlling circuitry configured to produce the position of the drawing object on the first path is further configured to:
    generate a point on the first path nearest to the center of the drawing object.

* * * * *